No. 11,936.

Reissued Oct. 15, 1901.

L. C. CARY.

CAR COUPLING.

(Application filed Dec. 3, 1900.)

2 Sheets—Sheet 1.

Witnesses

Alfred A. Eicher

J. R. Rippey

Inventor

Lewis C. Cary.

By Higdon & Longan, Atty's.

No. 11,936.

Reissued Oct. 15, 1901.

L. C. CARY.

CAR COUPLING.

(Application filed Dec. 3, 1900.)

2 Sheets—Sheet 2.

Witnesses

Alfred A. Eicher

J. H. Ripley

Inventor

Lewis C. Cary.

By Higdon & Longan, Attys

UNITED STATES PATENT OFFICE.

LEWIS C. CARY, OF EL PASO, TEXAS, ASSIGNOR, BY DIRECT AND MESNE ASSIGNMENTS, OF TWO-THIRDS TO JULIA CALDWELL, OF SAME PLACE, AND CHARLES A. RASBURY, OF DALLAS, TEXAS.

CAR-COUPLING.

SPECIFICATION forming part of Reissued Letters Patent No. 11,936, dated October 15, 1901.

Original No. 621,224, dated March 14, 1899. Application for reissue filed December 3, 1900. Serial No. 38,600.

*To all whom it may concern:*

Be it known that I, LEWIS C. CARY, a citizen of the United States, residing at El Paso, in the county of El Paso and State of Texas, have invented certain new and useful Improvements in Automatic Car-Couplers; and I do hereby declare the following to be a full, clear, and exact description of the invention, such as will enable others skilled in the art to which it appertains to make and use the same.

This invention relates to improvements in car-couplers of the type known as the "Janney" for use by itself or in connection with any form of the Janney coupler.

An object of the invention is to provide a car-coupler of this type which may with little expense and change be inserted in the head of any common form of link-and-pin coupler at a nominal cost and which may be removed at any time to permit a link and pin to be used.

A further object is to improve upon the operation of the coupler, so that there will be less danger to the brakeman in providing means for opening the coupler in case it becomes accidentally closed when the cars stand uncoupled, an objection now encountered in the Janney type, and also to do away with rods extending on the side or ends of the car, which are apt to cause accidents to brakemen in jumping from between the cars after coupling the same; and the invention consists in other minor improvements, which will be more fully pointed out in the specification and claims.

For a full and complete understanding of the invention reference is to be had to the accompanying drawings, in which corresponding letters indicate like parts in the several views, and in which—

Figure 1:
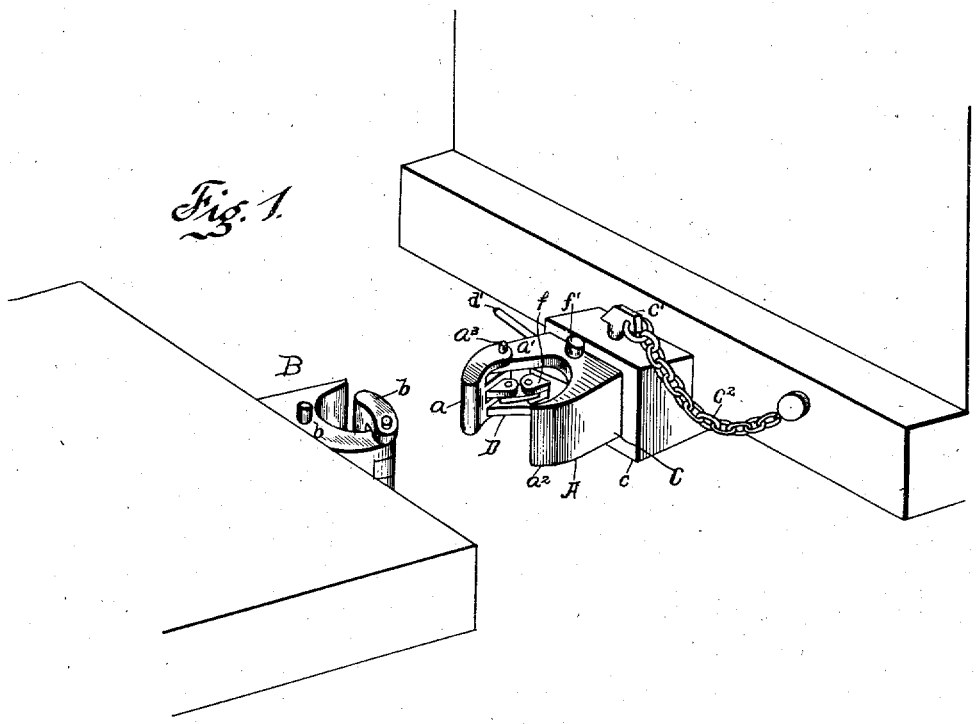
Figure 2:
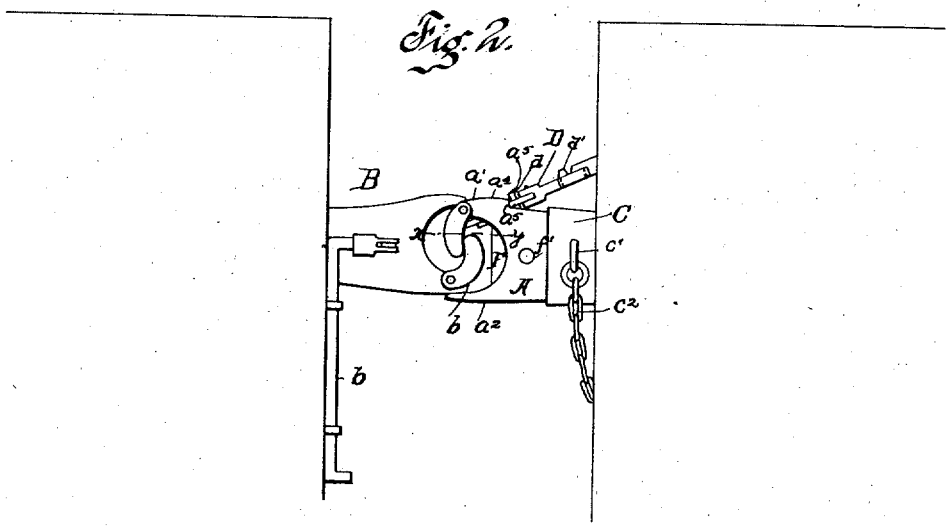
Figure 3:
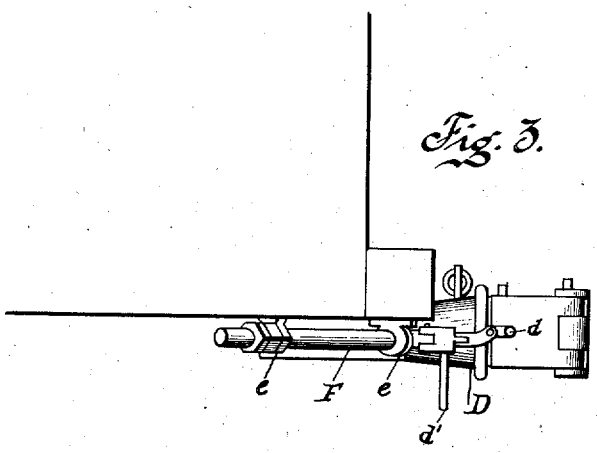
Figure 4:
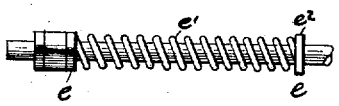
Figure 5:
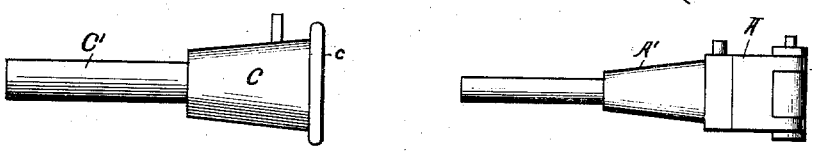
Figure 6:
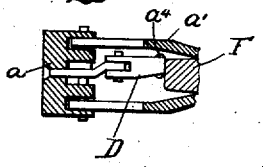

Figure 1 is a perspective view of the adjacent ends of two cars, representing one of my improved couplers and a Janney type opposite the same. Fig. 2 is a plan view of the same, illustrating the couplers coupled together. Fig. 3 is a side view of one of the couplers attached to the bottom of a car in a closed position. Fig. 4 is a view of a spring device which may be used in connection with the coupler when desired. Fig. 5 is a view in side elevation of a common form of link-and-pin draw-head and my coupler ready for insertion into the head of the same. Fig. 6 is a sectional view of the head of the improved coupler, taken on line $x\,y$ of Fig. 2.

In the drawings, A refers to the head of the improved coupler of the form of a Janney coupler having two jaws $a'$ $a^2$ in the forward extremity of the former, being pivoted to the hinged lock portion $a$, which is opened and shut by means of a link D, pivoted at its forward end to the middle portion of $a$, as shown, and extending diagonally rearward through an opening $a^4$ formed in the jaw $a'$ and being connected at its rear end to the front end of a sliding rod E, mounted in suitable brackets $e$ on the bottom of the car. The jaw $a'$ has a sharp offset $a^5$ at the rear end of opening $a^4$, and link D has a projection $d$ near its middle portion, which bears against this offset $a^5$ when said projection lies in a horizontal plane with respect to said link and securely locks the link. This projection is so arranged that it will only bear against said offset when the lock portion $a$ is in a shut position, (see Fig. 2,) and this link is capable of a partial revolution by means of raising a lever $d'$, rigidly attached to the link, so as to raise the projection $d$ from a horizontal position to a vertical position with respect to said link, which permits the projection to escape or be forced by said lever through the opening $a^4$, and thus unlock the hinged portion $a$, (see Fig. 1,) and when in this locked position if the coupler comes in contact with a Janney coupler or a similar coupler in a locked or unlocked position the impact will force the hinged portion shut, and handle $d'$ will drop into a depressed or vertical position, thereby throwing the projection $d$ behind the offset $a^5$, thereby securely locking the hinged portion $a$.

The head of the coupler A is provided with a rearwardly-extending extremity A', and both the head and this portion are of suitable size to be readily inserted in the head C and draw-bar C' of a type similar to a common form of link-and-pin coupler, or they may be secured independently of an old coupler when it is removed or a new car built under the platform of the car in the usual manner.

When the improved coupler is modified for use with the old form of coupler, the coupling-pin of the latter serves the purpose of holding the improved coupler therein, the draw-bar of the former being apertured to permit the coupling-pin to be inserted in it.

Sliding rod E may have one end of a spiral or coil spring secured to it between the brackets *e* to assist in the forward thrust of the link D to open the hinged portion *a* when the lever *d'* is raised; but this spring is not an essential part of the device, as the coupler can be operated readily by the lever itself.

F is a reinforcement or block to strengthen the head A and may be used or not. When it is used, it is held in place by means of a coupling-pin *f'*, passing through the head A and into a corresponding or registering aperture in the block, and a corner of said block may be cut away adjacent to recess $a^4$, so as not to interfere with the operation of link D.

By this arrangement it will be readily seen that a brakeman by using lever *d'* is not compelled to go between the cars, as he would have to do in case he had to unlock the Janney coupler when the hinged portion thereof or door became closed and he would not be in danger of being caught by the handle-bar, such as are used to operate Janney couplers to unlock or uncouple cars, when he had coupled the cars and jumped back to get out of the way, which often happens where such bars are used. The link D is so arranged that the hinged portion or door *a* is capable of opening only a sufficient distance to permit an easy coupling of the cars, and this link is especially constructed of steel or suitable material to insure great strength and certainty of action.

Having thus described my invention, what I claim, and desire to secure by Letters Patent, is—

1. The combination in a car-coupler, of a head and draw-bar capable of use with or independently of a link-and-pin coupler, a hinged portion on one of the jaws of the coupler, one of said jaws having a recess formed therein and an offset adjacent to said recess, a link having its front end pivotally connected to the said hinged portion and projecting through said recess, a sliding rod connected to the rear end of said link, a projection on said link adapted to contact at certain times with said offset to lock the coupler, a handle on the said link for operating the same, and means to automatically close and lock said hinged portion of the coupler when two cars come together, substantially as specified.

2. A car-coupler comprising a head and draw-bar capable of attachment in a link-and-pin coupler, a knuckle-joint or hinged portion pivoted to one of the jaws of the coupler, one of said jaws having a rear cut-away recess therein and an offset at the rear end of said recess, a link pivotally secured at its front end to the middle part of the hinged portion, and passing through said recess, its rear end being pivotally secured to a sliding rod, said rod being mounted in suitable brackets on the bottom of a car, a projection on said link capable, when in a horizontal plane with said link, of contacting with said offset, when the hinged portion is closed, to lock the coupler, and a handle on said link for revolving the link and to operate the same, substantially as specified.

3. The combination in a car-coupler, of a head and draw-bar capable of use with or independently of a link-and-pin coupler, a knuckle-joint or hinged portion on one of the jaws of the coupler, a link pivotally secured at its forward end to said hinged portion, passing rearwardly through a cut-away portion in one of said jaws and being secured at its rear end to a sliding bar, said bar being mounted in suitable brackets on the car-bottom, an offset on one of the jaws at the rear end of said cut-away recess, a projection on said link capable of securely contacting with said offset, when said projection is in a horizontal plane with respect to the link and said hinged portion is closed, a handle on said link for revolving the same, and means to open said hinged portion when it is closed and means to automatically close and to lock said hinged portion of the coupler when two cars come together, substantially as described and set forth.

In testimony whereof I affix my signature in presence of two witnesses.

LEWIS C. CARY.

Witnesses:

ALFRED A. EICKS,
JOHN D. RIPPEY.